April 21, 1931.  E. H. LORENZ  1,801,355

SYNCHRONIZING DEVICE

Filed June 4, 1927

Inventor
E. H. Lorenz
by Robert A. Brown
Attorney.

Patented Apr. 21, 1931

1,801,355

UNITED STATES PATENT OFFICE

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE

SYNCHRONIZING DEVICE

Application filed June 4, 1927. Serial No. 196,623.

The general object of the invention is to maintain two independently driven mechanisms in synchronism with each other.

A more specific object of the invention is the provision of a synchronizing mechanism which will act automatically on relative increase or decrease of the speed of one of two independently driven coordinated mechanisms to restore and maintain desirable synchronism between said coordinated mechanisms.

A still further object of the invention is the provision in a synchronizing device of the character described of novel and reliable means operable in response to variations in the relative speeds of the mechanisms to utilize pressure fluid to effect the required adjustment of the speed of the controlled mechanism.

Figure 1:
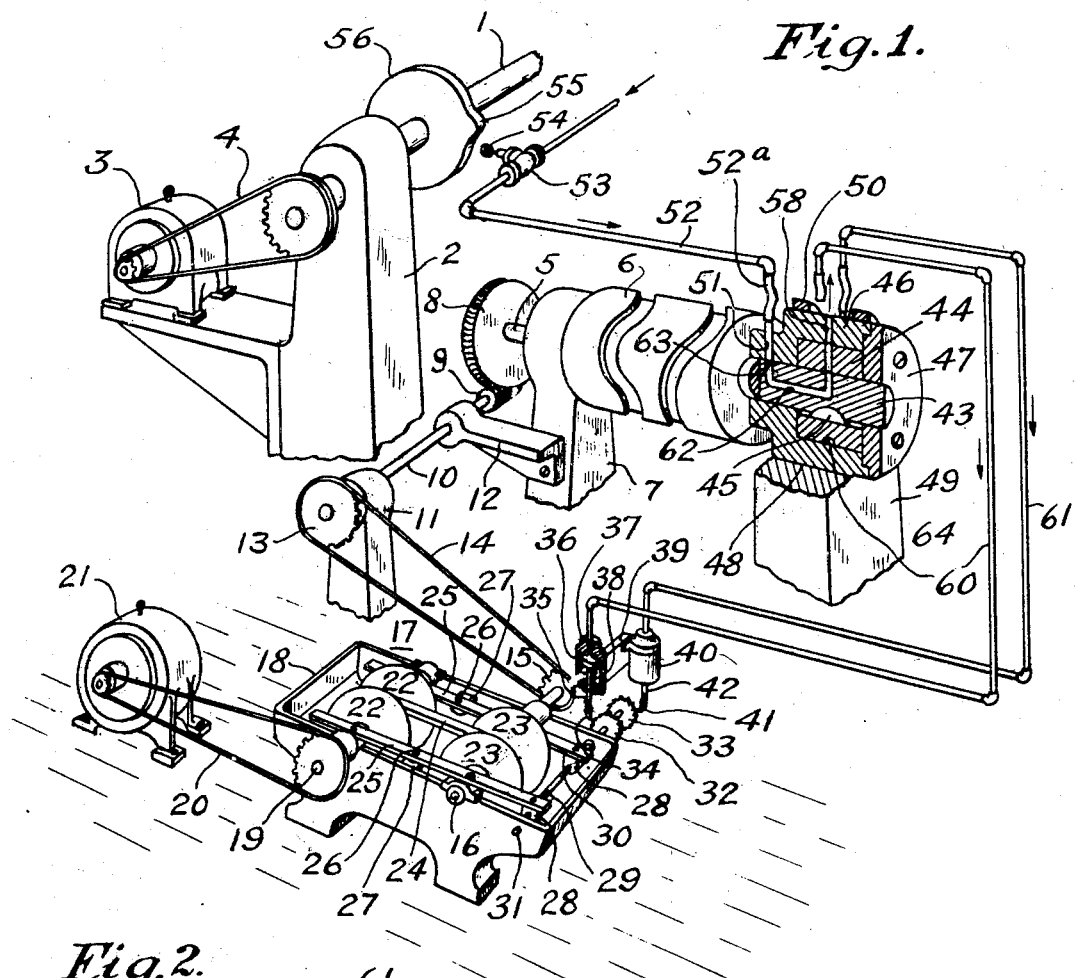
Figure 2:
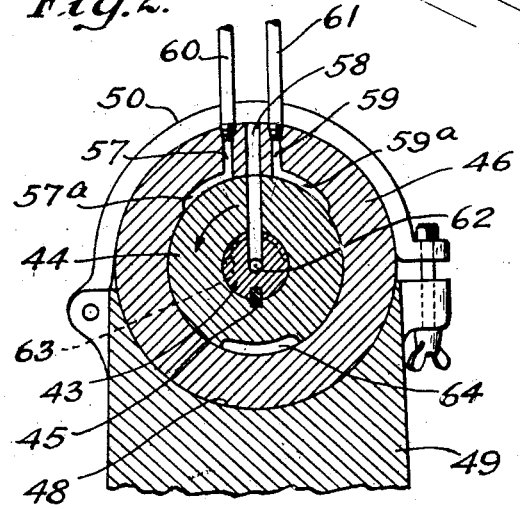

Other objects and advantages of the invention will be apparent from the following description, when considered in conjunction with the accompanying drawings, in which:

Figure 1 is a fragmentary perspective group view of parts of two independently driven mechanisms, with one form of synchronizing device embodying the invention associated therewith, portions of the synchronizing device being shown in section; and Fig. 2 is a relatively enlarged fragmentary vertical section through a valve structure which is included in the synchronizing device, together with a mounting for such valve.

In Fig. 1, the numeral 1 designates a shaft which is journaled in a bearing on a suitable support 2 and is driven continuously by a motor 3 through the medium of suitable motion transmitting connections designated generally by 4 between the drive shaft of the motor and the shaft 1. Preferably, the motor 3 is of the constant speed type and operates to drive the shaft 1 at a constant speed. However, it is not essential to the present invention that the shaft 1 be operated at constant speed. The shaft 1 may be a rotating part of a glass feeder, a glassware forming machine or other mechanism with which the operating movements of an independently driven mechanism, represented by the shaft 5, are to be synchronized. The shaft 5 may be an actual operating part of a glassware forming machine, a lehr stacker, or other mechanism or, as illustrated in Fig. 1, may carry a cam 6 or other suitable actuating or trip-off mechanism for controlling the operations of such forming machine, lehr stacker, or other mechanism. The shaft 5 is journaled in a bearing on a support 7 and is provided with a worm wheel 8 in mesh with a worm 9 on a final drive shaft 10. The shaft 10 may be journaled in bearings on the supporting members 11 and 12, respectively, and may carry a sprocket 13 which is connected by a chain 14 with a sprocket 15 on the driven variable speed shaft 16 of a variable speed transmission that is generally indicated at 17. The variable speed transmission 17 is of a well known type of construction and per se forms no part of the present invention. Such variable speed transmission comprises a substantially rectangular frame 18 having bearings on its side members for the aforesaid variable speed shaft 16 and also having bearings on its side members for a constant speed shaft 19. The shaft 19 is driven by a suitable motion transmitting connection 20 with the drive shaft of a motor 21. A pair of cone faced discs 22 are mounted on the constant speed shaft 19 between the side members of the frame 18 so as to rotate with the shaft 19 and to be capable of sliding on the shaft 19 toward and from each other. The apexes of the cone faced discs 22 face each other. A pair of similar cone faced discs 23 are mounted on the variable speed shaft 16 with their apexes facing each other so as to rotate with the shaft 16 and to be adjustable on the shaft 16 toward and from each other.

A belt 24 of substantially V-shaped cross-sectional configuration runs over the pairs of cone faced discs and fits in the V-channels between the discs on the shafts 16 and 19. Levers 25 for adjusting the cone faced discs on the shafts 16 and 19 to vary the speed of rotation of the shaft 16 while the speed of rotation of the shaft 19 remains constant are fulcrumed intermediate their ends at 26 on suitable brackets 27 on side members of the frame 18 and respectively are connected adjacent to their opposite ends to the adjacent discs 22 and 23 on the shafts 19 and 16. End portions of the levers 25 carry nuts 28 which respectively are engaged with right and left hand threads 29 and 30 respectively on portions of a transverse adjusting rod or shaft 31. The rod 31 is journaled in bearings in side members of the frame 18 and has an extending end portion provided with ratchet wheels 32 and 33 which have teeth on their peripheries facing in opposite directions.

A pawl 34 for engaging the teeth of the ratchet wheel 32 to turn the adjusting rod 31 in a counter-clockwise direction is carried by a depending stem 35 of a piston 36 in a vertical cylinder 37. The piston 36 is maintained at the upper end of the cylinder 37 by an expansion spring 38. The cylinder 37 is secured on a suitable support, as 39, so that the pawl 34 will be out of engagement with the teeth of the ratchet wheel 32 when piston 36 is at the upper end of its stroke and so that the pawl 34 will engage the teeth of the ratchet wheel 32 at the beginning of the downward movement of the piston 36 and will cause angular movement of the ratchet wheel 32 and of the adjusting rod 31 in a counter-clockwise direction, thus causing the nuts 28 to move on the shaft 31 toward each other and correspondingly decreasing the space between the cone faced discs 23 and widening the space between the cone faced discs 22.

Since the belt 24 automatically adjusts itself to the avialable space between the cone faced discs on the shafts 19 and 16, movements of the nuts 28 on the adjusting rod 31 toward each other will result in deceleration of the speed of rotation of the shaft 16 while the shaft 19 is rotating at a constant speed. Acceleration or increase of speed of the shaft 16 while the speed of the shaft 19 remains constant is effected by turning the adjusting shaft 31 in a clock-wise direction. This will be done when a piston similar to the piston 36 moves downward in a cylinder 40 so that an actuating pawl 41 on the lower end of the piston stem 42 will engage teeth of the ratchet wheel 33 and will move the ratchet wheel 33 and the shaft 31 angularly in a clock-wise direction.

The operating or downward movements of the pistons in the cylinders 37 and 40 are controlled in such manner as to be responsive to variations in the speed of rotation of the controlled member 5. This desirable result is obtained by the operation of synchronizing mechanism which will now be described: Such mechanism includes a valve having a core 43 which may be an end portion of the controlled member 5 or may be separate from the member 5, but connected therewith in any suitable manner so as to rotate in unison with the member 5. The core 43 may include a disc 44 secured to the remainder of the core by a key 45 and is journaled in a shell 46. The shell 46 may include a removable head 47 so that convenient removal and replacement of the disc 44 from the remainder of the core 43 and of the shell from the core may be effected if desired, or the disc 44 may be an integral part of the core 43. The shell 46 rests in a substantial semi-circular seat 48 in the top of a base 49 and can be turned angularly about the axis of the core 43 on seat 48 for a purpose to be presently stated, and secured in adjusted position on the seat 48 by a suitable clamping device 50. When the core 43 constitutes an end portion of the controlled member 5 as shown in Figure 1, the shell 46 functions also as a bearing which cooperates with the base 49 and the support 7 to rotatably support the member 5 and the core 43 as a unit.

The shell 46 is provided adjacent to one end with a radial port 51 for connection with an end portion of an air supply pipe 52. The air supply pipe 52 includes a flexible section 52a adjacent to the shell to permit angular adjustment of the shell on its support. The air supply pipe 52 is adapted for connection with any suitable source of air or other fluid under pressure and a portion of this air supply pipe extends adjacent to the controlling member 1 and includes a normally closed valve 53 having an inwardly slidable stem 54 provided with a button or head at its outer end disposed in the path of a projection 55 on a cam 56 which is secured to the member 1, whereby the valve 53 will be opened once during each rotation of the member 1 as a result of the actuation of the valve stem 54 by the cam projection 55.

The shell 46 also has three angularly spaced ports 57, 58 and 59 extending radially through its walls as best seen in Fig. 2. The ports 57 and 59 are located equal distances at opposite sides of the port 58 and preferably are enlarged at their inner ends to extend in opposite directions part of the distance around the inner wall of the shell 46 as indicated at 57a and 59a, respectively.

The port 57 is connected by a suitable pipe 60 with an inlet port in the top of the cylinder 36 while the port 59 is connected by a suitable pipe 61 with an inlet port in the upper end of the cylinder 40. The pipes 60 and 61 include flexible sections to permit angular adjustment of the shell 46 on its seat in the manner hereinbefore described. The port 58 is open at its outer end to the atmosphere. Air under pressure entering the port 51 passes therefrom through a passage 62 in the core 43—44 to one of the ports 59, 58 or 57 according to the angular position of the radially disposed delivery end of the passage 62 in the shell at the time of the discharge of air from the core. It will be observed that the radial intake end of the air passage 62 opens in the bottom of a groove 63 in the periphery of the core 43. The groove 63 is continuously in communication with the port 51 so that air from the port 51 can flow into the passage 62 at any time but can flow from the passage 62 only when the outer end of such passage is in communication with one of the ports 57, 58 or 59.

The operation of the device is substantially as follows: The controlling member 1 and the member 5 that is to be controlled may, for example, be operating parts of a glass feeder and a glassware forming or fabricating machine, respectively, or operating parts of a glassware forming machine and a lehr stacker for picking up glassware from the forming machine and delivering such ware to a lehr, respectively. These members 1 and 5 are independently driven by the means hereinbefore described, and preferably the shaft 1 is driven at a substantially constant speed, as previously stated. The shell of the synchronizing valve is turned angularly in its seat 48 about the axis of the core 43 so that the delivery end of the passage 62 in the core will register with the waste port or vent 58 in the shell at that time in the cycle of movement of the member 1 at which a puff or blast of pressure fluid will be discharged through the passage 62 as a result of a momentary opening of the valve 53 by the projection 55 on the cam 56. It can be readily seen that the adjustability of the shell 46 provides a simple means for changing the timed relation at which synchronism is maintained between the members 1 and 5. This relative adjustment of the parts of the synchronizing valve can be effected during the operation of the hereinbefore described parts. The escape of the pressure fluid through the vent 58 will of course occasion no change of speed of movement of the member 5. However, should the speed of rotation of the member 5 decrease relative to that of the member 1 until the outer end of the delivery passage 62 no longer registers with the port 58 at the proper time after the opening of the valve 53, but registers with the port 59 instead, the blasts of pressure fluid then will pass through the pipe 61 to the cylinder 40 and will effect actuation of the adjusting shaft 31 in increments as required to increase the speed of the variable speed shaft 16 and to correspondingly increase the speed of rotation of the member 5 as required to cause the outer end of the passage 62 to again register with the port 58 at the time pressure fluid is discharged through the pasasge 62. The port 59 and the pipe 61 therefore may be termed the accelerating air port and the accelerating air pipe.

Should the speed of rotation of the member 5 be increased relative to that of member 1 so that the blasts of air passing through the passage 62 after each actuation of the valve 53 by the cam projection 55 will enter the port 57, such blasts of air will actuate the piston in the cylinder 37 and cause actuation in increments of the adjusting shaft 31 as required to decelerate the speed of the variable speed shaft 16 and consequently to decelerate the speed of the member 5 as required to cause registration of the delivery end of the passage 62 with the port 58 at the proper time in each rotation of the member 1. The port 57 and the pipe 60 therefore may be termed the decelerating air port and decelerating air pipe, respectively.

It will be manifest that the improved synchronizing mechanism will act automatically to restore and maintain synchronism between the movements of the two independently driven coordinated machines or mechanisms with which the synchronizing mechanism is used. This is particularly beneficial in the glass working art where the operations of two independently driven mechanisms are so related to each other as to require practically continuous and exact synchronism between such mechanisms for their successful operation.

Exhaust of used pressure fluid from the cylinders 37 and 40 may take place through the pipes 60 and 61, the ports 59 and 57, the port 64 in the rotor 44, and the vent 58, each exhaust taking place between successive operating puffs from the valve 53.

The term "synchronizing" and "synchronism" as herein employed are not confined to their precise meanings as defined in dictionaries; namely, to exact coincidence or simultaneousness of operation. These terms as herein employed relate to the obtaining and maintaining of proper time relation in the operations of the respective parts, whether those operations are simultaneous or otherwise.

I claim:

1. A synchronizing device for two independently driven mechanisms, comprising a variable speed device controlling the speed of operation of one of said mechanisms, and means operating independently of the material acted on by said mechanisms for measuring the relative speeds of said two independently driven mechanisms and for automatically actuating said variable speed device when required to gradually restore a synchronous relation between the operations of said two independently driven mechanisms.

2. In combination, a speed controlling mechanism, a speed controlled mechanism, independent driving means for said mechanisms, the driving means for the controlled mechanism including a variable speed transmission, and means directly connected to one of said mechanisms and automatically effective on relative increase or decrease of speed of said controlled mechanism to adjust said variable speed transmission as required to restore the former speed of said controlled mechanism.

3. In combination, a speed controlling mechanism, a speed controlled mechanism, independent driving means for said mechanisms, the driving means for the controlled mechanism including a variable speed transmission, and means operating independently of the material acted on by said mechanisms controlled jointly by said controlling mechanism and said controlled mechanism for adjusting said variable speed transmission to correspondingly increase the speed of the controlled mechanism in increments on a decrease in the relative speed thereof and to correspondingly decrease the speed of the controlled mechanism in increments on an increase in the relative speed thereof.

4. In combination, a speed controlling mechanism, a speed controlled mechanism, independent driving means for said mechanisms, the driving means for said speed controlled mechanism including a variable speed transmission, and means operating independently of the material acted on by said mechanisms having connections with said speed controlling mechanism, said speed controlled mechanism and said variable speed transmission to automatically adjust said variable speed transmission in increments on relative increase or decrease of the speed of the speed controlled mechanism to correspondingly decrease or increase the speed of said speed controlled mechanism so as to restore and maintain synchronism.

5. In combination, two independently driven mechanisms, the driving means for one of said mechanisms including a variable speed transmission, a fluid pressure unit for actuating said variable speed transmission to increase the speed of the associated driven mechanism, a second fluid pressure unit for actuating said variable speed transmission to decrease the speed of the associated driven mechanism, a valve controlled by the independently driven variable speed mechanism, said valve having an inlet, a delivery outlet connected with said speed increasing fluid pressure unit, a second delivery outlet connected with said speed decreasing fluid pressure unit, and a waste outlet intermediate said delivery outlets, means controlled by the other independently driven mechanism for delivering a blast of pressure fluid to the inlet of said valve once during each cycle of movement of the last named independently driven mechanism, and means for adjusting said valve so that the blast of pressure fluid will be discharged from the valve through said waste outlet while the speed relation between said independently driven mechanisms remains unchanged and will be delivered through said first named delivery outlet to the speed increasing pneumatic unit on decrease in the relative speed of the independently driven variable speed mechanism or through the second delivery outlet to the speed decreasing pneumatic unit on increase in the relative speed of said independently driven variable speed mechanism.

6. In combination, two independently driven members, the driving means for one of said members including a variable speed transmission, a pair of pneumatic units respectively adapted to adjust said variable speed transmission to increase and decrease the speed of the associated independently driven member, a fluid pressure supply pipe having a normally closed valve, means operable by the second independently driven member to open said valve once for each cycle of movement of said independently driven member, and a synchronizing valve controlled by said variable speed member so as to connect said fluid pressure supply pipe with the atmosphere during maintenance of synchronism between said two independently driven members and for temporarily connecting said fluid pressure supply pipe with the speed increasing pneumatic unit on decrease in the relative speed of the variable speed member and with the speed decreasing pneumatic unit on increase of the relative speed of said variable speed member.

7. In combination, two independently driven rotating members, the speed of rotation of one of said members being variable, a valve comprising a core rotated in unison with said variable speed member, a shell housing said core, said shell having an inlet for pressure fluid and having a waste port and a delivery port spaced angularly from each other about the circumference of the shell, said core having a passage continuously in communication with said inlet port and in communication with said waste port and said delivery port successively for each rotation of the core, means responsive to the rotation of the second independently driven mechanism to discharge a blast of pressure fluid into the inlet of said valve on each rotation of said second driven member, said shell being adjustable about the axis of the core to cause said blasts to be discharged from said waste port when the speed of rotation of the variable speed member is desirably related to the speed of the second rotating member and to divert said blasts into said delivery port on a change of the relative speed of said rotating members, and pneumatic means operable by a blast from said delivery port to adjust the speed of said variable speed rotating member to restore said desirable relation between the speeds of said rotating members.

8. In a synchronizing device for two independently driven rotating members, a valve including a core rotated in unison with one of said members and a shell having an inlet port and three outlet ports, the latter ports being spaced angularly about the circumference of the shell, the middle outlet port being open to the atmosphere, said core having a passage having an inlet end continuously in communication with said inlet port and having its delivery end located in position to register with said three outlet ports successively during each rotation of the core, means responsive to the operations of the second independently driven member to deliver blasts of pressure fluid periodically to the inlet port of said valve, said shell being adjustable about its core to cause register of the delivery end of the passage of the core with said waste outlet at the times of delivery of said blasts when said independently driven members are operating at desirable relative speeds and to cause register of the delivery end of said core passage with one of said delivery ports on an increase in the relative speed of the first rotating member and with the other of said delivery ports on decrease in the relative speed of said first rotating member, and means operable by a blast of pressure fluid through the first delivery port to decrease the speed of the first rotating member and operable by a blast through the second delivery port to increase the speed of said first rotating member, whereby synchronism between said rotating members will be restored.

9. In combination, two independently driven coordinated mechanisms, one operating at a constant speed and the other at a variable speed, pnuematic means for changing the speed of said variable speed mechanism, and means operating independently of the material acted on by said mechanisms controlled jointly by said constant speed mechanism and said variable speed mechanism to deliver operating pressure fluid to said speed changing pneumatic means.

10. In combination, a speed controlling mechanism, a speed controlled mechanism, independent driving means for said mechanisms, the driving means for the controlled mechanism including a variable speed transmission, and a plurality of pneumatic devices automatically effective respectively on relative increase or decrease of speed of said controlled mechanism to adjust by increments said variable speed transmission as required to restore the former speed of said controlled mechanism.

11. The combination with two independently driven mechanisms normally in synchronism with each other, of driving means for one of said mechanisms including a variable speed transmission capable of adjustment through fine gradations to drive its mechanism at any speed between a maximum and a minimum, means controlled by the relative speeds of said independently driven mechanisms for gradually adjusting said variable speed transmission, and means for changing the timed relation at which synchronism is maintained between said mechanisms.

12. The combination with two independently driven mechanisms normally in synchronism with each other, of driving means for one of said mechanisms including a variable speed transmission capable of adjustment through fine gradations to drive its mechanism at any speed between a maximum and a minimum, means actuated in response to a change of the relative speeds of said independently driven mechanisms to gradually adjust said variable speed transmission, and means for changing the timed relation at which synchronism is maintained between said mechanisms, said timing means being adjustable while said mechanisms are in operation.

13. The combination with two independently driven mechanisms normally in synchronism with each other, of driving means for one of said mechanisms including a variable speed transmission capable of adjustment through fine gradations to drive its mechanism at any speed between a maximum and a minimum, means actuated in response to a change of the relative speeds of said independently driven mechanisms to gradually adjust said variable speed transmission, and means for setting said adjusting means to change the timed relation at which synchronism is maintained between said mechanisms.

14. In combination with a plurality of independently driven machines, a variable speed transmission device connected to one of said machines for driving the latter, whereby said machines may be operated in synchronism, power operated means for adjusting said transmission device, intermittently operated means controlled by one of said machines for supplying a power medium to said power operated means, and continuously actuated intermittently operative means controlled by the other of said machines for controlling the supply of power medium from said last named means to said power operated means.

15. In combination with a driven member, a machine to be driven in synchronism with said member, a variable speed transmission device for driving said machine whereby said member and machine may be operated in synchronism, power operated means for adjusting said device, means operated continuously at timed intervals by said driven member to supply a power medium to said power operated means, and means actuated continuously by said machine for controlling the supply of power medium from said last-named means to said power operated means, the last-mentioned means being normally inoperative to supply said power medium to said power operated means.

16. In combination with a driven member and a continuously operated machine, means for operating said member and machine in synchronism, said means comprising a variable speed transmission device for driving said machine, fluid pressure operated means for adjusting said device, a plurality of valves for controlling the supply of fluid pressure to said means, means connected to said driven member for operating one of said valves, and means connected to the said machine for operating the other of said valves.

17. In combination with a plurality of independently driven machines, a variable speed transmission device connected to one of said machines for driving the latter, and means interposed between said transmission device and the machine driven independently thereof for causing the said machines to be operated in synchronism, said means comprising fluid pressure operated means for adjusting the said device, a plurality of valves for supplying fluid pressure to said fluid pressure operated means, means connected to one of said machines for operating one of the said valves at timed intervals, means connected to the other machine for operating the other of the said valves to control the flow of fluid pressure from the first-named valve to the said fluid pressure operated means, whereby variations in the relative speed of the two machines causes corresponding adjustments of said transmission device to restore synchronism in the operation of said machines, and means for varying the time at which synchronism is maintained between said machines.

Signed at Hartford, Conn., this 27th day of May, 1927.

EDWARD H. LORENZ.